(12) United States Patent
Frantz

(10) Patent No.: US 10,066,671 B2
(45) Date of Patent: Sep. 4, 2018

(54) BEARING ARRANGEMENT

(71) Applicant: Danfoss Power Solutions, Inc., Ames, IA (US)

(72) Inventor: Stephen Frantz, Ames, IA (US)

(73) Assignee: Danfoss Power Solutions Inc., Ames, IA (US)

( * ) Notice: Subject to any disclaimer, the term of this patent is extended or adjusted under 35 U.S.C. 154(b) by 0 days.

(21) Appl. No.: 14/884,925

(22) Filed: Oct. 16, 2015

(65) Prior Publication Data
US 2017/0108048 A1    Apr. 20, 2017

(51) Int. Cl.
*F16C 33/78*    (2006.01)
*F16C 35/07*    (2006.01)
*F16C 35/063*    (2006.01)
*F16C 3/06*    (2006.01)
*F16C 23/04*    (2006.01)
*F16C 23/08*    (2006.01)
*F16C 33/58*    (2006.01)
*F16C 19/46*    (2006.01)
*F16C 19/54*    (2006.01)

(52) U.S. Cl.
CPC ............. *F16C 35/07* (2013.01); *F16C 3/06* (2013.01); *F16C 23/04* (2013.01); *F16C 23/08* (2013.01); *F16C 33/586* (2013.01); *F16C 35/063* (2013.01); *F16C 19/46* (2013.01); *F16C 19/54* (2013.01)

(58) Field of Classification Search
CPC ...... F16C 23/04; F16C 23/041; F16C 23/043; F16C 23/06; F16C 23/08; F16C 23/082; F16C 23/088; F16C 2360/42
See application file for complete search history.

(56) References Cited

U.S. PATENT DOCUMENTS

| | | | | |
|---|---|---|---|---|
| 1,995,408 A * | 3/1935 | Wallgren | ............. | F16C 23/00 384/309 |
| 2,592,718 A * | 4/1952 | McGhee | ............. | D01H 5/56 19/294 |
| 2,659,637 A * | 11/1953 | Barr | ............. | F16C 19/46 384/558 |
| 2,987,351 A * | 6/1961 | Aberle | ............. | F16C 19/46 384/558 |
| 3,766,792 A * | 10/1973 | Braun | ............. | E21C 29/16 384/202 |
| 3,796,471 A * | 3/1974 | Holm | ............. | F16C 13/00 384/558 |
| 3,969,029 A * | 7/1976 | Schaeffler | ............. | D01H 5/82 384/202 |

(Continued)

FOREIGN PATENT DOCUMENTS

CN    103557187 A    2/2014
DE    585098 C    10/1933

(Continued)

*Primary Examiner* — Thomas R Hannon

(74) *Attorney, Agent, or Firm* — McCormick, Paulding & Huber LLP

(57) ABSTRACT

A bearing arrangement includes a shaft with an outer circumferential supporting surface, and a mounting device with an inner circumferential supporting surface. The mounting device supports the shaft in a rotatable manner using a bearing structure. At least one tiltable sleeve member is arranged between at least one of the supporting surfaces and the bearing structure.

9 Claims, 2 Drawing Sheets

(56) References Cited

U.S. PATENT DOCUMENTS

| | | | | |
|---|---|---|---|---|
| 4,035,040 A * | 7/1977 | Yarris | ................... | B60B 35/02 |
| | | | | 301/5.7 |
| 5,437,209 A | 8/1995 | Santoro | | |
| 5,960,675 A | 10/1999 | Murota | | |
| 7,909,090 B2 | 3/2011 | Reid | | |
| 8,157,548 B2 * | 4/2012 | Meier | ................... | F02M 59/06 |
| | | | | 417/490 |
| 8,500,336 B2 | 8/2013 | Kouscheschi et al. | | |
| 2010/0254641 A1 | 10/2010 | Hoppe | | |
| 2014/0354098 A1 | 12/2014 | Krebs et al. | | |

FOREIGN PATENT DOCUMENTS

| | | | | |
|---|---|---|---|---|
| DE | 749856 C | 1/1945 | | |
| DE | 1425932 A1 | 3/1969 | | |
| DE | 2223721 A1 | 6/1973 | | |
| DE | 102006051332 A1 | 5/2008 | | |
| DE | 102009028997 A1 * | 3/2011 | ............ | F02M 59/02 |
| EP | 2703665 A1 | 3/2014 | | |
| GB | 803501 A | 10/1958 | | |
| GB | 870841 A | 6/1961 | | |
| JP | WO 2008099819 A1 * | 8/2008 | ............ | F16C 23/082 |

\* cited by examiner

BEARING ARRANGEMENT

TECHNICAL FIELD

The invention relates to a bearing arrangement for rotatably supporting a rotatable shaft in a mounting device and more specifically to a new and useful improvement of such a bearing arrangement.

BACKGROUND

In a vast number of technological fields, a rotatable support of a shaft (or a similar device) in a mounting device is necessary. As an example, rotatable shafts have to be rotatably supported in some kind of housing or holding arrangement for conveyor systems, wheels for vehicles and all kinds of generators, pumps and motors. As a particular example, in the field of pumps or motors, a crankshaft (on which usually some kind of pistons are arranged) has to be rotatably supported in a mounting area of a housing (where the mounting area can be a blind hole or a through hole, as an example).

For making the device as efficient and as durable as possible, the friction of the respective bearing arrangement (rotatable support of the shaft in the mounting area) has to show as little friction as possible, while keeping an eye of economic feasibility at the same time, of course.

For providing a low frictional, durable and still economical support that is able to support comparatively high loads, different types of bearings are in use. Besides the less favourable slide bearings (which usually have a low friction due to some lubricants in the space between the supporting surfaces of the shaft and the mounting device), in particular ball bearings and roller bearings are employed, the latter ones particularly, if higher demands for low friction and/or low wear are present.

Although such bearings work well in practice, they still show some disadvantages, in particular under certain operating conditions. A problematic condition that frequently occurs in practice is if the mounting area (which is generally typically as some kind of a tubular bore (e.g. a blind bore or a through bore)) and the shaft are not perfectly aligned to each other with respect to their longitudinal axis, but instead show an angular misalignment. In particular in case of roller bearings, even relatively small angular offsets can result in a comparatively high wear of the rollers of the roller bearings. Of course, such an increased wear will result in a significantly lower durability of the respective device, which is not really desired.

To overcome this disadvantage, sometimes ball bearings are suggested. However, ball bearings typically show a lower load capacity as compared to needle bearings of the same size, or described vice versa, they need more installation space for the same mechanical load capacity. This is disadvantageous, of course. Furthermore, even if ball bearings are employed, they usually can only sensibly be employed up to a certain angular offset.

Another approach is to "artificially enlarge" the diameter of the shaft and the corresponding mounting bore, although the corresponding enlarged dimension is not necessary from a viewpoint of the loading capacity of the respective device. This is, because when employing a larger diameter of the shaft, a certain offset in a radial direction at a position spaced from the bearing arrangement (measured in length units like millimeters) will result in a smaller angular offset. It is clear that this approach is disadvantageous as well, since it results in increased installation space and in increased weights of the respective components, which usually leads to lower energy efficiency as well. Sometimes increasing the size is not even an option, if certain size restrictions apply.

Therefore, an improved bearing arrangement is required that is less prone to wear due to angular offsets.

This invention provides such a useful bearing arrangement that is improved over bearing arrangements that are known in the state of the art.

SUMMARY

It is therefore suggested to design a bearing arrangement, comprising a shaft with an outer circumferential supporting surface, and a mounting device with an inner circumferential supporting surface, wherein said mounting device supports said shaft in a rotatable manner using a bearing means in a way that at least one tiltable sleeve member is arranged between at least one of said supporting surfaces and said bearing means. With this comparatively simple design, it is possible to design the bearing arrangement in a way that it is able to receive an angular misalignment of said shaft and said mounting device without increasing a contact load in certain surface parts of said bearing means (which relates in particular to an uneven contact load across the respective surface). This is particularly possible, because some, majority or even (essentially) all of the angular misalignment can be balanced by a tilting (and/or inclination, pivoting, rocking, (inner) flexing, (inner) bending, and/or (inner) twisting) of the sleeve member.

The following description of preferred embodiments and examples of the invention is not intended to limit the invention to these preferred embodiments, but rather to enable any person skilled in the art to make and use this invention.

It is to be understood, that all equivalences of the invention that are readily conceivable by a person skilled in the art are assumed to be contained, enclosed and disclosed within this description. Furthermore, all such embodiments, alterations and equivalences are covered by the scope of this application as long as they fall under the scope of the claims, attached hereto.

In particular, it is possible to combine certain of the herein described aspects, features and so on of the presently proposed bearing arrangement. This particularly relates to combinations of the description of general and preferred embodiments of the presently proposed bearing arrangement and/or possibly of the detailed examples of the presently suggested devices.

BRIEF DESCRIPTION

Figure 1:
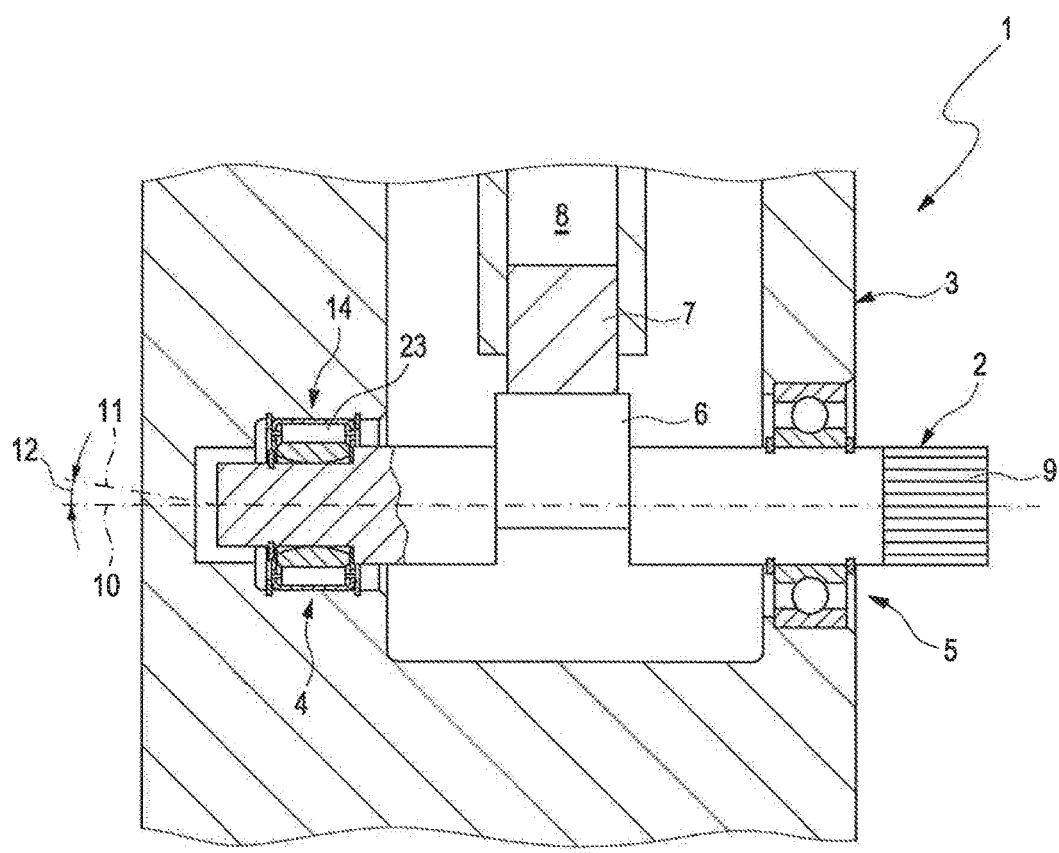
FIG. 1: a fluid working machine according to a first embodiment with bearing arrangements in a schematic cross section.

In particular, when using a tiltable sleeve member as presently suggested, it is usually possible that the surfaces directly neighbouring the building space where the rolling elements are arranged (typically balls or rollers) can be arranged to be "perfectly parallel" to each other. Therefore, it is usually possible that standard bearing means that are readily available on the market can be used in combination with the presently proposed bearing arrangement and nevertheless a bearing arrangement which can be even significantly less prone to angular offsets can be provided in a cost-effective way. It is readily understandable that the amount of tilt/inclination of certain parts of the tiltable sleeve member along its circumference usually have to be different. This can be easily provided by using a somewhat elastic material. Since the tiltable sleeve member usually does not have to be too large (in particular too thick, i.e. its extent in a radial direction), metals, in particular metals like copper, brass, steel, spring steel or the like can be used for this purpose. However, different materials are possible as well. Just to name some examples, some resilient material like plastics, resin, fibre reinforced plastics (using glass fibres/carbon fibres) and the like might be employed as well for this purpose. Apart from this the remaining components can usually be of a standard design (including the bearing means, as already mentioned). Therefore, despite the advantages of the presently proposed bearing arrangement, standard components can be used that are readily available on the market so that the overall cost for the bearing arrangement can be very low. Furthermore, the design provides some kind of a "snap-in solution" (although the sizes chosen might vary a little bit from the sizes of the components which would be chosen "normally" (i.e. in the absence of a tiltable sleeve member, in particular)).

According to a preferred embodiment at least one of said at least one tiltable sleeve member is arranged between one of said supporting surfaces and said bearing means. First experiments have shown that arranging the tiltable sleeve member at this position usually yields the best results. In particular it is possible to provide "essentially perfectly aligned" surfaces for receiving the bearing means and/or the rollers or balls of said bearing means. This way, wear of the respective bearing means/rollers/balls can be usually minimised.

Another preferred embodiment can be achieved if said tiltable sleeve member is arranged between said outer circumferential supporting surface of said shaft and said bearing means. First experiments have indicated that this very position is usually even more advantageous with respect to compensating angular offsets and/or reducing wear of the bearing means due to an angular offset.

Usually, it is preferred that for the bearing arrangement at least one of said supporting surfaces and/or at least one of the surfaces of said tiltable sleeve member and/or at least one of surfaces of said bearing means is designed as a bossed surface, preferably being in contact with an essentially plain surface. This way, the tilting can be "effectuated" by a rolling motion of a bossed surface on a plain surface (or another neighbouring surface), or—if seen vice versa—by a rolling motion of a plain surface on a bossed surface. This way a particularly simple design is possible that is yet very effective. The bossed surface can show a curvature that is essentially a segment of a circle (if seen as a cross-sectional cut through the respective portion of the device). Nevertheless, deviations thereof are possible as well. In particular, a convex shape of the bossed surface of essentially any type is possible, although typically a segment of a circle is preferred. Usually it is sufficient if a single bossed surface is provided. This way, manufacturing of the bearing arrangement and/or of the tiltable sleeve member and/or of the mounting device and/or of the shaft can be very simple. In this case, the remaining surfaces (i.e. the remaining (circumferential) supporting surfaces and/or the remaining surfaces of the bearing means and/or the remaining surfaces of the tiltable sleeve member) will usually be plain surfaces. This does not necessarily exclude that some "rounded corners", tapered surfaces and so on are provided or that possibly some recesses or protrusions in some areas are foreseen (which can be used for a simpler assembly of the device and/or for providing a labyrinth seal, a limiter for movements in an axial direction and so on).

Another preferred embodiment can be obtained if said tiltable sleeve member comprises a bossed surface and an (essentially) plain surface, preferably on opposing sides of said tiltable sleeve member. This way, the manufacturing process of the bearing arrangement can be even more simplified. In particular, standard components of the "regular parts" can be used (regular shaft, regular mounting bore, regular bearing means). Put in other words, the "special surface part" can thus be limited to the tiltable sleeve member, which is usually an additional part that has to be foreseen. This way, the resulting bearing arrangement comes as close to a "snap-in solution" as possible. Even a retrofit becomes possible.

In particular it is suggested that in said bearing arrangement said bossed surface of said tiltable sleeve member faces a supporting surface while said essentially plain surface of said tiltable sleeve member faces said bearing means. First experiments have shown that this arrangement is particularly advantageous, in particular with respect to little wear of the components involved in combination with high potentially achievable supporting loads.

Yet another preferred embodiment can be achieved if said supporting surface is equivalent to said outer circumferential supporting surface of said shaft. "Said supporting surface" is presently meant to be the supporting surface that faces the bossed surface of said tiltable sleeve member. This placement of the respective services has proved to be usually particularly advantageous for the presently proposed bearing arrangement, in particular with respect to decreased wear.

An even more preferred embodiment can be realized if said outer circumferential supporting surface of said shaft comprises a bossed surface. This is particularly the case, if the bearing arrangement and/or the device (for example the fluid working machine) the bearing arrangement is used for is designed "from scratch" (as opposed to a situation where the presently proposed bearing arrangement is used as a "snap in solution"). Here, first evaluations have surprisingly shown that if the bossed surface is arranged on the shaft (i.e. the outer circumferential supporting surface of the shaft is designed as a bossed surface), the overall cost for the bearing arrangement can be even lower (and possibly even lower as compared to the situation where the bossed surface is provided on the tiltable sleeve member). This situation can occur, since the shaft needs some machining anyhow. Therefore, usually the machine tool (if employed) can be easily programmed to provide a bossed surface in a particular part of the shaft (typically without rearranging the shaft in the machine tool). This frequently proves to be less complicated as machining the tiltable sleeve member.

It is proposed that said bossed surface of said shaft faces a preferably essentially plain surface of said tiltable sleeve member. This way, the tiltable sleeve member can roll with its (preferably essentially plain) surface on the bossed surface that is provided on the shaft, this way "effectuating" the tilting for "perfectly aligning" the surfaces between which the bearing means (in particular a roller bearing or needle roller bearing) is enclosed.

A particularly simple arrangement of the bearing arrangement can be realized if said tiltable sleeve member comprises two essentially plain surfaces that preferably lie parallel to each other. Such sleeves can usually be easily obtained by cutting a tube into several ring-like pieces. This embodiment of a bearing arrangement is particularly useful, if the bossed surface is arranged on the shaft.

In particular, it is possible to design the bearing arrangement in a way that said bearing means is taken from the group, comprising needle roller bearings, roller bearings, slide bearings and ball bearings. It should be understood that not only a type of "essentially closed" bearing is possible, where the respective bearing elements (needles, rollers, balls and so on) are encased in grooves of concentrically arranged ring-like structures in a way that essentially no surface parts of the bearing elements (e.g. rollers, needles and balls) are in mechanical contact with "outside parts". Instead, bearing means are possible, where some or extended parts of the respective bearing elements are "mechanically accessible" by other members (for example by a surface of the tiltable sleeve member and/or a surface of one of the supporting surfaces). As an example, the respective bearing members could be held in position only by elements that are arranged in sideward areas (first part and/or last part of the bearing means when seen in an axial direction), or could comprise (essentially) no supporting elements at all.

A particularly advantageous embodiment can be achieved if said bearing means is a needle roller bearing. In this case, the intrinsic advantages and features of the presently proposed bearing arrangement can be recognised particularly well.

It is further suggested to design the bearing arrangement in a way that the length of said tiltable sleeve member is equivalent to the length of said bearing means. By a "length", typically an extent in an axial direction is meant. Using this design, not only the installation space can be reduced, but also wear due to an axial movement of the shaft with respect to the mounting area can be reduced.

Another preferred embodiment can be realised if the clearance between said shaft and the regressed portions of said bossed surface of said tiltable sleeve member is chosen in a way to keep the contact load between said bossed surface of said tiltable sleeve member and said supporting surface of said shaft below the capabilities of the materials. This way, a particularly long-lasting bearing arrangement can be realised.

Yet another preferred embodiment can be achieved if said bearing arrangement is designed as a bearing arrangement for a fluid working machine. Here, the design features of the presently proposed bearing arrangement can show their intrinsic characteristics and advantages particularly well.

In particular, the bearing arrangement can be designed as a bearing arrangement for a hydraulic fluid working machine.

In particular, the bearing arrangement can be designed in a way to receive an angular misalignment of said shaft and said mounting device without increasing contact load in certain surface parts of said bearing means. This feature can particularly be realised by using some of the previously described design features alone and/or in combination.

Furthermore, a fluid working machine is suggested that comprises at least one bearing arrangement of the presently proposed type.

In FIG. 1 a fluid working machine 1 is shown in part in a schematic cross section. The fluid working machine 1 comprises a housing 3, in which a crankshaft 2 is arranged in a way that it can be rotated with respect to the housing 3.

The crankshaft 2 comprises two bearing points 4, 5, where the crankshaft 2 is rotatably supported by the housing 3. In the currently depicted embodiment, the bearing point 4 on the left side in FIG. 1 comprises a needle roller bearing 23, while the bearing point 5 that is shown on the right side in FIG. 1 comprises a ball bearing (where the ball bearing is presently of a standard type well known in the state of the art).

In addition, the crankshaft 2 shows an eccentric 6 on which a piston 7 is arranged sliding in a way that it shows a back-and-forth movement in a cavity 8 when the crankshaft 2 is rotated. The back-and-forth movement of the piston 7 and the cavity 8 can be used to pump hydraulic oil to a high-pressure reservoir, for example. Details of the pumping functionality are not shown presently for brevity, but are well known in the state of the art and readily realizable by a person skilled in the art.

A portion of the crankshaft 2 that extends outward of the housing 3 shows a toothed portion 9 for a torque-proof connection with other components (not shown).

Due to tolerances of the components used, the central axis 10 of the crankshaft 2 and the central axis 11 of the housing 3 typically show an angular offset, so that an angle 12 exists between them. If the components used (in particular the housing 3, but also the crankshaft 2 and other components) are machined with a higher precision, the angle 12 can be made smaller. However, machining with higher precision is more costly and therefore disadvantageous. Furthermore, apart from machining tolerances, an angular offset 12 of the crankshaft 2 can also occur due to mechanical load that is exerted by the piston 7 onto the crankshaft 2, which results in a bending of the crankshaft 2. Since the mechanical load varies depending on current operating conditions, the bending of the crankshaft 2, and hence the size of the angle 12 varies in an unpredictable way depending on operating conditions. Unfortunately, if a somewhat larger angle 12 is present between the two central axes 10, 11, an increased wear of the bearing point 4 (and possibly of bearing point 5) that rotatably supports the crankshaft 2 occurs. This can be the limiting factor of the lifetime of the fluid working machine 1. Early failure of a bearing will result in costly repairs and is frequently not tolerated by customers on the long-term run. In particular roller bearings and/or needle bearings (as currently employed for bearing point 4 in FIG. 1) are prone to increased wear if an angular offset 12 between the two central axes 10, 11 occurs. It should be noted for the sake of perception that the indicated angular offset 12 is drawn exaggerated. Such high angular offsets 12 are usually not occurring in practice. Furthermore, the curvature of the bossed surface 20 of the tiltable sleeve 15 (according to the presently described first embodiment of a bearing arrangement 14) and of the bossed surface 32 of the crankshaft 35 (according to the presently described second embodiment of a bearing arrangement 31) are exaggerated as well for the sake of perception (both discussed later in detail). Usually, the curvature will be smaller.

To provide a bearing arrangement 14 (see also FIG. 2, in which an enlarged schematic cross-sectional view through a part of the bearing arrangement 14 that is provided at the "left" bearing point 4 in FIG. 1 is shown), a special arrangement with an additional tiltable sleeve 15 is chosen. This way, the resulting bearing arrangement 14 can tolerate even comparatively large angular offsets 12 without an undue increase in wear, although a usually very vulnerable needle bearing arrangement 23 is chosen (vulnerable with respect to an increased mechanical wear due to angular offsets 12).

At bearing point 4, the rotatable crankshaft 2 is provided with an outer circumferential surface 16 that, according to the presently shown first embodiment of a bearing arrangement 14, is manufactured as a plain surface (i.e. no convex or concave surface is present as seen in the axial direction; of course, due to the cylindrical shape of the outer circumferential surface 16, the respective surface is convex when going along a circumferential direction). Furthermore, on one side of the outer circumferential surface 16, a section 17 of the crankshaft 2 with an increased radius is used to hinder the tiltable sleeve 15 from a movement in the axial direction "toward the right". Similarly, on the opposing side of the outer circumferential surface 16, a groove 18 is arranged in which a circlip 19 (or a similar device) can be arranged. The circlip 19 hinders the tiltable sleeve 15 from an axial movement "toward the left".

The outer circumferential surface 16 is encircled by a tiltable sleeve 15. The tiltable sleeve 15 has a bossed surface 20 on one side and a plain surface 21 on the other side (according to the presently shown first embodiment). In the presently shown embodiment, the bossed surface 20 is directed toward the outer circumferential surface 16 (i.e. toward the inner side of the tiltable sleeve 15), while the plain surface 21 is directed toward the outside of the tiltable sleeve 15, facing the needle rollers 22 of the needle roller bearing 23.

The needle roller bearing 23 is designed as a partially open needle roller bearing. Therefore, the needle rollers 22 are in direct mechanical contact with the plain surface 21 of the tiltable sleeve 15. To hold the needle rollers 22 in their appropriate positions, an embracing outer ring 24 is provided. The embracing outer ring 24 is arranged in-between the needle rollers 22 and the inner circumferential surface 25 of the housing 3 that is provided at the bearing point 4 of the fluid working machine 1. Presently, both surfaces (radially located outer and inner surface) of the embracing outer ring 24 of the needle roller bearing 23 and the inner circumferential surface 25 are designed as plain surfaces. Also, the needle rollers 22 of the needle roller bearing 23 are designed as "plain cylinders". I.e., they do not show a conical shape. Only for completeness, it should be noted that the needle rollers 22 can comprise some axial protrusions 26 (as it is presently the case), which can contact the embracing outer ring 24 of the needle roller bearing 23. In particular, bores can be provided in the embracing outer ring 24, so that the needle rollers 22 can be held in their appropriate positions, while still being able to rotate. Such a design is readily available to a person skilled in the art and further details are presently not described due to brevity.

Similar to the groove 18 with an inserted circlip 19 that is used in connection with the crankshaft 2, the housing 3 shows two grooves 18 in the vicinity of the bearing point 4, in which circlips 19 (and similar devices) are inserted for hindering an axial movement of the needle roller bearing 23.

Figure 2:
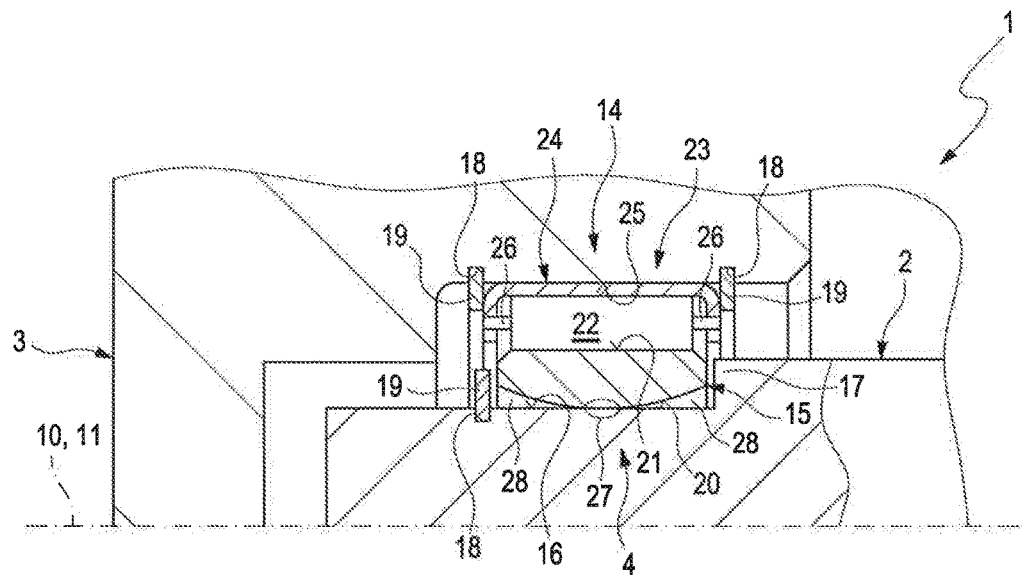
FIG. 2: an enlarged cross-section through a section of a bearing arrangement of a fluid working machine according to a first embodiment.

As can be seen particularly from FIG. 2, the "axial length" (axial extent) of the inner circumferential surface 25 of the housing 3, of the outer circumferential surface 16 of the crankshaft 2, of the needle bearing 23 and/or of the tiltable sleeve 15 (showing a ring-like structure; so it could be addressed as a tiltable sleeve ring or a tiltable ring) are essentially the same. Therefore, essentially no axial movement of the crankshaft 2 relative to the housing 3 is foreseen and/or possible.

However, the force supporting area 27 between the bossed surface 20 of the tiltable sleeve 15 and the (plain) outer circumferential surface 16 of the crankshaft 2 is smaller (contrary to this, the extent of the force supporting area/ contact area between the tiltable sleeve 15, the needle rollers 22, the embracing outer ring 24, the needle roller bearing 23 and/or the inner circumferential surface 25 of the housing 3 essentially correspond to each other and/or to the axial length of the bearing point 4). Outside of the force supporting area 27 (the contact area between the tiltable sleeve 15 and the outer circumferential surface 16 of the crankshaft 2), a clearance 28 is present on both sides of the force supporting area 27.

If an angle 12 between the central axes 10, 11 of the crankshaft 2 and the housing 3 occurs, this angular offset 12 can be compensated by virtue of the tiltable sleeve 15. In particular, the tiltable sleeve 15 will roll with its bossed surface 20 along the outer circumferential surface 16 of the crankshaft 2 in an axial direction. This way, the plain surface 21 of the tiltable sleeve 15 and the surfaces of the needle rollers 22 of the needle roller bearing 23 can be kept "perfectly aligned" in parallel to each other (of course, in reality some minor tolerances will usually be present). If the bossed surface 20 rolls along the outer circumferential surface 16 of the crankshaft 2, the force supporting area 27 will move correspondingly to the right or to the left (view of FIG. 2). Consequently, the size (height and/or length) of the clearances 28 on the left and the right side of the force supporting area 27 will change as well.

It is to be noted that due to geometrical considerations, the necessary tilting angle of the tiltable sleeve 15 (with respect to the outer circumferential surface 16) will change along the circumference of the tiltable sleeve member 15 and the crankshaft 2, respectively. Therefore, the force supporting area 27 will usually not form a straight ring along the outer circumferential surface 16 of the crankshaft 2. Instead, it will show axial bends in an axial direction along its circumference. Therefore, the tiltable sleeve 15 will be twisted in itself when going around its circumference. Therefore, for the tiltable sleeve 15 a material has to be selected that shows a good compromise between a sufficient ability for twisting and a sufficient stability against mechanical forces that occur due to the mechanical load that is imposed on the bearing arrangement 14. First experiments have shown that steel, in particular tool steel and/or spring steel is able to fulfill both requirements decently at the same time. Once again it should be noted that the angles 12 between the central axes 10, 11 are normally comparatively small so that the required ability for twisting of the tiltable sleeve 15 is not particularly large.

It is readily apparent to the person skilled in the art that the bossed surface 20 can be chosen from a wide variety. In the presently shown example, the bossed surface 20 follows the segment of a circle (although in principle other convex shapes are equally possible). Furthermore, the bossed surface is arranged in a way that it is mirror symmetric to the middle plane of the tiltable sleeve 15 (in an un-deformed state that is). However, non-symmetric shapes of the bossed surface 20 may be equally employed and may even prove to be advantageous particularly for special operating conditions.

Likewise, the place (the places), where the bossed surface (or even a plurality of bossed surfaces) is (are) arranged can vary from the previously described first embodiment of a bearing arrangement 14.

Figure 3:
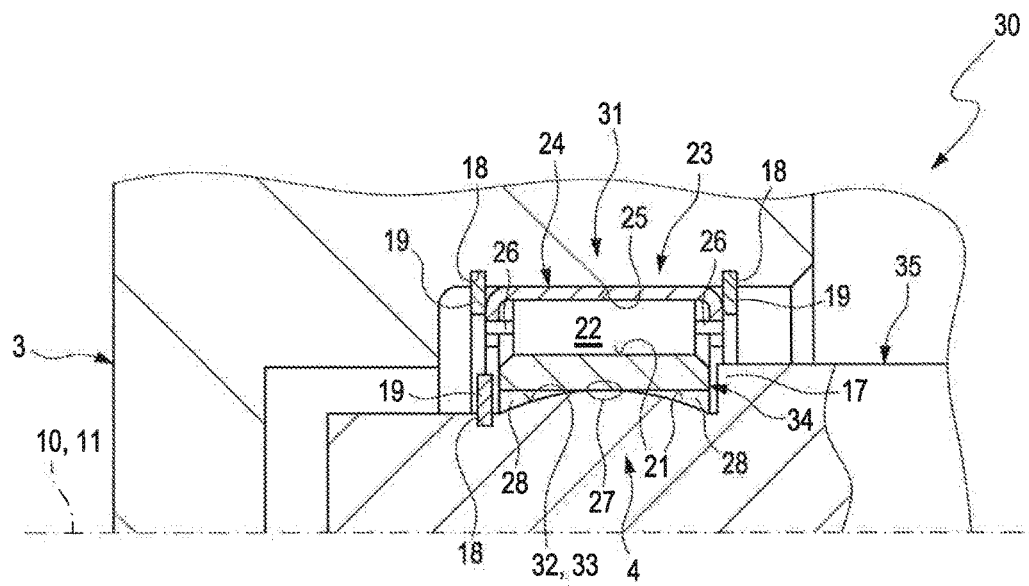
FIG. 3: an enlarged cross-section through a section of a bearing arrangement of a fluid working machine according to a preferred, second embodiment.

An example for this is shown according to a second embodiment of a bearing arrangement 31 as depicted in FIG. 3. Such a bearing arrangement 31 is shown as an enlarged sectional view of a cross-section through the bearing arrangement 31. The bearing arrangement 31 is used for a bearing point 30 (according to the second embodiment) that can replace the bearing point 4, as shown in FIGS. 1 and 2 (and as previously described), for example.

FIGS. 2 and 3 show essentially the same view. Furthermore, most parts involved are essentially the same or are at least similar to each other. For improved understandability, similar (or even same) parts are shown with identical numerals. It should be understood that identical numerals do not necessarily imply that perfectly identical parts are employed. Instead small deviations may occur. Typically, the purpose of the respective part is similar or the same, if identical numerals are used. Even if different numerals are used, the respective parts can have similar features to a certain extent.

According to the second embodiment of a bearing arrangement 31, as a major difference to the first embodiment of a bearing arrangement 14, the bossed surface 32 of the bearing arrangement 31 is arranged on the outer circumferential surface 33 of the crankshaft 35 (in the section along the axial direction of the crankshaft 35 in which the bearing arrangement 31 is located). This design can prove to be the preferred embodiment, if the fluid working machine 1 is sort of designed "from scratch" (i.e. previously designed and/or previously manufactured parts are not necessarily used). It should be noted that a machining of the crankshaft 35 (or of the crankshaft 2 according to the first embodiment) is necessary in (almost) any case. During this machining, it is usually not very problematic to provide a bossed surface 32 in the section of the crankshaft 35 where the bearing arrangement 31 is located. Usually, only a modification of the program of the machine tool is necessary for this. It should be noted, however, that (at least to a certain extent) no "previously used parts" can be used any more since the size and/or the design of at least some of the parts have to be adapted for obtaining a fluid working machine according to the second embodiment.

Corresponding to the bossed surface 32 that is arranged along the outer circumferential surface 33 of the crankshaft 35, the tiltable sleeve 34 now shows two plain surfaces 21 that are arranged in parallel to each other (and opposing each other). In other words, the tiltable sleeve 34 has the design of a cylinder barrel (with finite thickness). Such a cylinder barrel is usually quite easy to produce. Frequently, a tube can simply be cut into several rings without any major machining efforts.

Despite of the "reversed design" (with respect to the arrangement of the bossed surface 32 that is located on the crankshaft 35 being in contact with the plain surface 21 of the tiltable sleeve 34), the tiltable sleeve 34 can still roll along the bossed surface 32, thus providing a "perfectly parallel" alignment of the plain surfaces that enclose the needle roller bearing 23 (or a similar bearing means). This has the previously described advantages.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A bearing arrangement comprising a shaft with an outer circumferential supporting surface, and a mounting device with an inner circumferential supporting surface, said mounting device supporting said shaft in a rotatable manner using a bearing means,
    wherein a tiltable sleeve member is arranged between the outer circumferential supporting surface and said bearing means,
    wherein an end section of the shaft has a reduced radius,
    wherein the outer circumferential supporting surface includes a groove in the section of reduced radius, with a circlip arranged in said groove,
    wherein the tiltable sleeve member is positioned about the section of reduced radius, and
    wherein the circlip retains the tiltable sleeve member on the section of reduced radius.

2. The bearing arrangement according to claim 1, wherein at least one of said supporting surfaces and/or at least one of the surfaces of said tiltable sleeve member is designed as a bossed surface being in contact with an essentially plain surface.

3. The bearing arrangement according to claim 2, wherein said tiltable sleeve member comprises a bossed surface and an essentially plain surface on opposing sides of said tiltable sleeve member.

4. The bearing arrangement according to claim 3, wherein said bossed surface of said tiltable sleeve member faces a circumferential supporting surface while said essentially plain surface of said tiltable sleeve member faces said bearing means.

5. The bearing arrangement according to claim 2, wherein said tiltable sleeve member comprises two essentially plain surfaces that lie parallel to each other.

6. The bearing arrangement according to claim 1, wherein said bearing means is a needle roller bearing.

7. The bearing arrangement according to claim 1, wherein an axial length of said tiltable sleeve member is equivalent to an axial length of said bearing means.

8. The bearing arrangement according to claim 1, wherein it is designed to receive an angular misalignment of said shaft and said mounting device without increasing a contact load in certain surface parts of said bearing means.

9. A fluid working machine, comprising at least one bearing arrangement according to claim 1.

* * * * *